United States Patent [19]

Wang

[11] Patent Number: 5,022,054

[45] Date of Patent: Jun. 4, 1991

[54] DIGITAL GMSK MODULATOR WITH NON-INTEGER BIT INTERVAL HANDLING

[75] Inventor: Chih-Fei Wang, Arlington Heights, Ill.

[73] Assignee: Motorola, Inc., Schaumburg, Ill.

[21] Appl. No.: 530,482

[22] Filed: May 25, 1990

Related U.S. Application Data

[63] Continuation of Ser. No. 278,080, Nov. 30, 1988, abandoned.

[51] Int. Cl.⁵ .................... H03K 7/06; H04L 27/12
[52] U.S. Cl. .................................... 375/64; 332/100
[58] Field of Search .................. 375/64, 114, 113, 62, 375/57, 108, 51, 67, 39, 47; 370/20, 84; 364/721, 723; 332/101, 104, 118, 123, 100

[56] References Cited

U.S. PATENT DOCUMENTS

| | | | |
|---|---|---|---|
| 4,414,675 | 11/1983 | Comroe | 375/90 |
| 4,562,581 | 12/1985 | Tanaka et al. | 375/113 |
| 4,581,749 | 4/1986 | Carney et al. | 375/44 |
| 4,606,051 | 8/1986 | Crabtree et al. | 375/86 |
| 4,686,688 | 8/1987 | Chung et al. | 375/64 |

OTHER PUBLICATIONS

"Digital Phase Modulation", by John B. Anderson, Tor Aulin and Carl-Erik Sundberg, Plenum Press, New York and London, 1986, pp. 209-235.
"Single-Chip Baseband Waveform Generator CMOS-LSI for Quadrature-Type GMSK Modulator", Electronics Letters, 11th Oct. 1984, vol. 20, No. 21, pp. 875-876.
"GMSK Modulation for Digital Mobile Radio Telephony", by Kazuka Murota, IEEE Transactions on Communications, vol. COM-29, No. 7, Jul. 1981, pp. 1044-1050.
"Bit Synchronization of Differentially Detected MSK and GMSK", by Marvin K. Simon and Charles C. Wang, 1985 IEEE, No. CH21-75-8/85/000-0583, pp. 583-590.

Primary Examiner—Benedict V. Safourek
Assistant Examiner—Tesfaldet Bocure
Attorney, Agent, or Firm—Val Jean F. Hillman

[57] ABSTRACT

A modulation circuit is used in GMSK modulation system. The system includes I-channel and Q-channel ROM look-up tables, each preprogrammed for generating a representative digital waveform based on an input data stream and a clock signal. Each digital waveform is converted to an analog signal for subsequent radio frequency (RF) modulation. Each ROM is addressed by an interpolation counter controlled by a clock signal, by a data shift register receiving input data at a rate corresponding to the clock signal, and by an quadrant register, also receiving the input data, for specifying the phase of the data signal with respect to the clock signal. Additionally, a signal indicates a time at whcih synchronization to the system clock is required and such synchronization requires synchronizing at a non-integer bit interval time, and in response to that signal, the address of the ROMs is adjusted in order to modify the phase of the data signal so that it is consistent with the system clock requirement.

14 Claims, 1 Drawing Sheet

DIGITAL GMSK MODULATOR WITH NON-INTEGER BIT INTERVAL HANDLING

This is a continuation of application Ser. No. 07/278,080, filed Nov. 30, 1988 and now abandoned.

FIELD OF THE INVENTION

The present invention relates generally to radio frequency (RF) circuits, and, more particularly, to RF modulation circuits.

DESCRIPTION OF THE PRIOR ART

Figure 1:
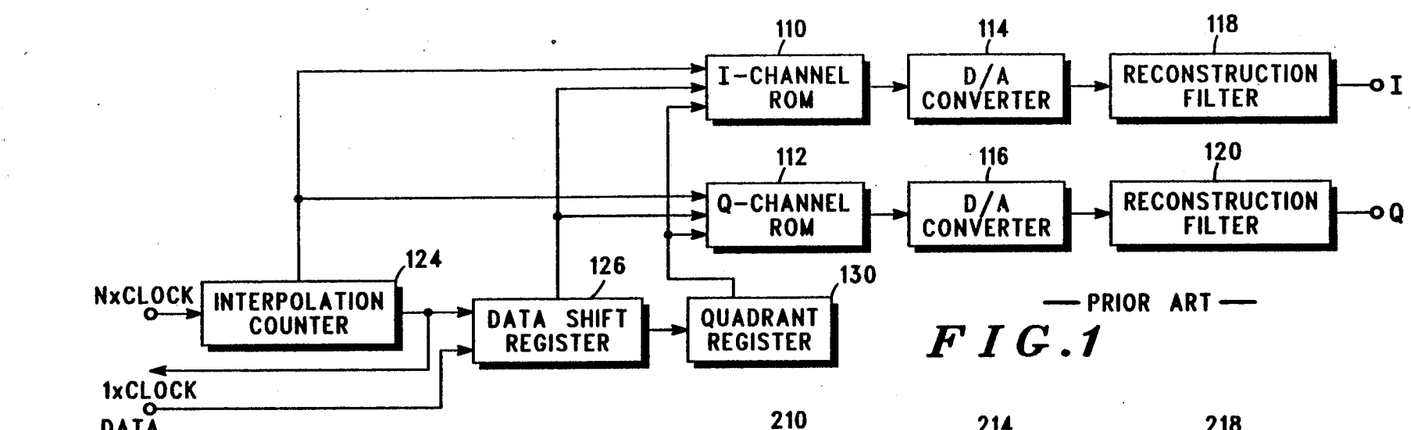
FIG. 1 is a block diagram of a modulation arrangement known in the prior art.

Gaussian Minimum Shift Keying (GMSK) modulation can be generated digitally by employing ROM (read only memory) look-up tables, or a combination of random logic and ROM look-up tables, using digital FIR (Finite Impulse Response) techniques. This is typically accomplished in an RF system by programming two ROMs with data to accommodate FIR filtering functions, one ROM programmed to produce the I channel component and the second ROM programmed to produce the Q channel component of the baseband GMSK signal. FIG. 1 illustrates this known approach. For more details on this modulation technique, reference may be made to H. Suzuki et al., "Single-Chip Baseband Waveform Generator CMOS-LSI for Quadrature-Type GMSK Modulator," Electronic Letters, 11 Oct. 1984, Vol. 20, No. 21, pp. 875-876, which discloses a diagram representative of that shown herein in FIG. 1. Additional background information of frequency shift keying, e.g., MSK or GMSK, modulation/demodulation systems may be obtained by referencing U.S. Pat. Nos. 4,606,051—Crabtree; 4,414,675—Comroe; and 4,581,749—Carney et al., all of which are assigned to Motorola, Inc. Reference may also be made to M. Simon and C. Wang, "Bit Synchronization of Differentially Detected MSK and GMSK," IEEE International Conference on Communications, June 1985, pp. 583-590; and K. Murota and K. Hirade, "GMSK Modulation for Digital Mobile Radio Telephony," IEEE Transactions on Communications, Vol. COM-29, No. 7, Jul., 1981, pp. 1044-1050. For information on digital phase modulation techniques using ROMs, reference may be made to John B. Anderson, Tor Aulin and Carl-Erik Sundberg, "Digital Phase Modulation," Plenum Press, New York, N.Y., 1986, pp. 211-235.

Such a technique works well with data being clocked out regularly on one bit intervals. However, there are times when the data has to be clocked for an interval greater than one bit (e.g., 1.25 bit). This may occur, for example, in TDMA (time division multiple access) systems which has time slots which contain a non-integer number of bits.

Theoretically, such a requirement would not cause a splatter in the transmission frequency spectrum since the data rate is lowered at such irregular times. However, the fractional bit interval causes a phase discontinuity in the ROM look-up table output. For this reason, known systems using the approach of FIG. 1 cannot be employed to accommodate such a requirement.

OBJECTS OF THE INVENTION

It is therefore a general object of the present invention to provide a digital modulation technique which overcomes the above mentioned shortcomings.

It is a more specific object of the present invention to provide a digital modulation technique which provides digital GMSK or any digital frequency modulation with non-integer interval capability.

The present invention may briefly be described in terms of a preferred embodiment. Essentially, a modulation circuit is used in a modulation system substantially synchronized to a system clock. The system includes one or more ROMs, each ROM being preprogrammed as a look-up table for generating a representative digital waveform based on an input data stream and a clock signal. Each digital waveform is converted to an analog signal for subsequent radio frequency (RF) modulation. Each ROM is addressed by an interpolation counter controlled by the clock signal, by a data shift register receiving input data at a rate corresponding to the clock signal, and by a quadrant register, also receiving the input data, for specifying the phase of the data signal with respect to the clock signal. Additionally, an external signal indicates a time at which a non-integer phase modulation synchronization to the system clock is required, and in response to that signal, the address of the ROMs is adjusted in order to modify the phase of the data signal so that it is consistent with the system clock requirement.

BRIEF DESCRIPTION OF THE DRAWINGS AND APPENDICES

App. A is a C language program useful for generating the contents of the ROMs 210 and 212 of FIG. 2.

App. B is a state diagram representing the operation of the quadrant register 230 of FIG. 2; and App. C is a state diagram representing the operation of the quarter bit register 240 of FIG. 2.

DETAILED DESCRIPTION OF THE PREFERRED EMBODIMENT

The arrangement disclosed in this specification is directed to GMSK signalling in an RF cellular radiotelephone communication system. More specifically, the instant invention is best used in a digitally generated GMSK signalling technique which allows data to be clocked into the signalling protocol at irregular non-integer intervals, e.g., at one quarter bit intervals.

Figure 2:
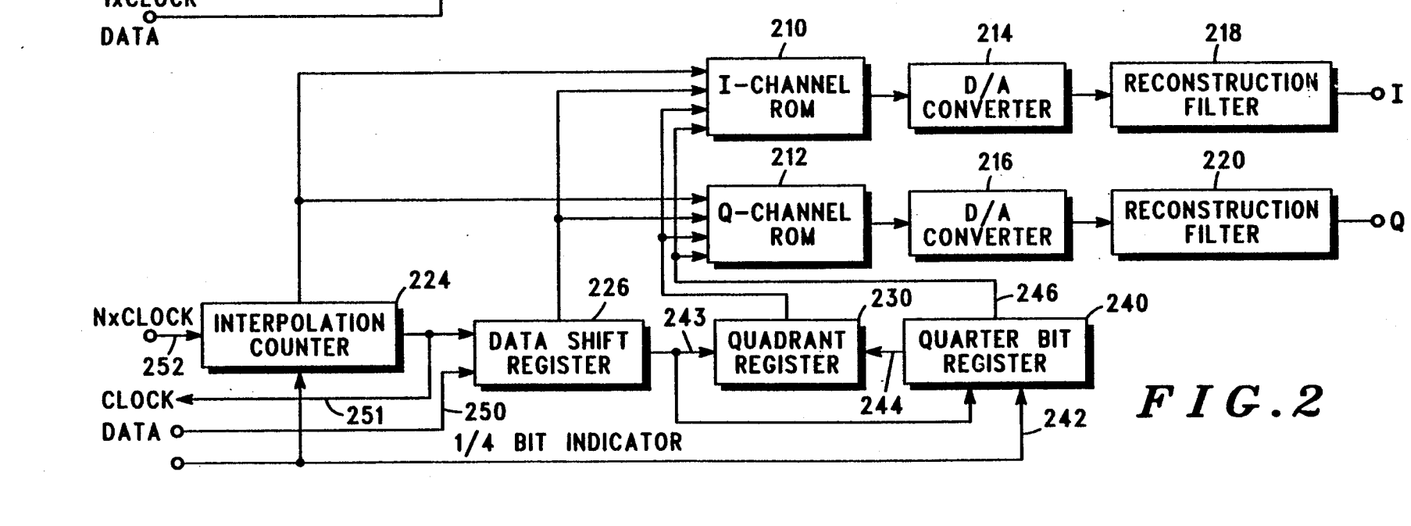
FIG. 2 is a block diagram of a modulation arrangement, according to the present invention.

FIG. 2 illustrates a general block diagram of an arrangement which embodies the instant invention. The arrangement of FIG. 2 is similar to the known arrangement of FIG. 1, but it includes an improvement to accommodate the signalling protocol at irregular non-integer intervals, as previously discussed. Common to both arrangements of FIGS. 1 and 2 are conventional 2048-byte ROMs 110/112 and 8192-byte ROMs 210/212, digital to analog (D/A) converters 114/116 and 214/216 such as a TDC1016 available from TWA, Inc., reconstruction filters 118/120 and 218/220 (preferably conventional Bessel low pass filters), interpolation counters 124 and 224 such as a conventional divide-by-N ripple counter, M-bit shift registers 126 and 226 having parallel data output, and quadrant registers 130 and 230 such as a conventional 2-bit up/down counter. Unique to the arrangement of FIG. 2 is a quarter-bit register 240, its associated ¼ bit indicator 242 and data 243, its quadrant register output 244 and its ROM address outputs 246.

Preferably, a 2-bit up/down counter is used to implement the quarter-bit register 240.

The operation of the arrangement of FIG. 2 will now be discussed in block diagram form using references to conventional counters and shift registers to facilitate discussion. This discussion will be followed with a state operational discussion of the quadrant register 230 and the quarter bit register 240 for more specific explanation.

The I- and Q- channel ROMs 210 and 212 are preprogrammed with data using a C language program, attached as appendix A. This program provides the data for the ROMs to serve four functions: (1) a digital FIR (Finite Impulse Response) filter, (2) an integration process, (3) phase correlation for sine and cosine processing of the I- and Q- channel components of the input data, and (4) NRZ (nonreturn-to-zero) to impulse conversion. Because GMSK modulation can be generated digitally by a digital FIR (Finite Impulse Response) filter, the FIR function is incorporated into the preprogrammed ROM data to approximate the required Gaussian data filter with NRZ data input and the phase angle output. The phase angle output is then used in conjunction with a SIN (sine) and a COS (cosine) portion of the respective ROM look-up tables to generate the I- and Q- channel baseband components in digital form.

The D/A converters 214 and 216 are used to convert the data output from the ROMs 210 and 212 to the I- and Q- channel baseband components in analog form. Conventional reconstruction filters 218 and 220 are then employed before the quadrature modulation step.

The interpolation counter 224 provides the interpolation filtering (oversampling) control for the ROMs 210 and 212 by addressing the ROMs 210 and 212 using its counter outputs. The interpolation counter 224 is used to ease the reconstruction filter design for anti-aliasing and sinx/x correction. The interpolation counter 224 is driven by a clock signal 252 operating at a rate of N times C, where C is the clock rate at which data is to be transmitted through the system and N is determined so that there is an adequate number of samples to represent a bit. Functioning as a divide-by-N counter, the output of the interpolation counter 251 is a clock signal operating at rate C. This output is connected to the data shift register 226 to clock data 250 therein, and connected to data source circuitry (not shown) so as to provide the rate at which data is to be received by the data shift register 226.

The data shift register 226 receives the data 250 in serial form and provides address signals to the ROMs 210 and 212 according to the program attached in appendix A in order for the ROMs to provide its representation in I- and Q-channel component form. The length of the data shift register 226 is determined to be greater than or equal to the duration of the FIR impulse response. In the illustrated embodiment, the length of the data shift register 226 is 5 bits.

The quadrant register 230 receives the data shifted out of the data shift register 226, and is used to inform the ROMs 210 and 212 of the phase angle of the data 250 for the phase angle calculation in the integration process of the program of appendix A. Because the program integrates in conjunction with the phase angle calculation, the calculation result may go beyond 0 to 360 degrees. Since the GMSK may be viewed as a Gaussian data filter followed by an FSK (frequency shift key) modulator with a modulation index of 0.5, i.e., the phase change due to FSK is always plus or minus 90 degrees at the end of a bit interval, a 2 bit quadrant register is sufficient to represent 1 of the 4 possible quadrants as a result of the integration process. When the energy of a modulating bit ripples through the FIR, the quadrant register 230 is incremented or decremented accordingly and the ROM look-up table can be restarted with a new bit shifted in.

A non-integer bit (fractional-bit) register 240, a quarter bit register in the illustrated embodiment, is introduced to handle irregular (unpredicted or aperiodic with respect to the clock rate C) data synchronization. This may occur in systems which require resynchronization for access transmission, e.g., resynchronization to a system clock in a TDMA (time division multiple access) system.

The quarter bit register 240 handles such irregularity by adjusting the addresses of the ROMs which specify the phase of the data signal. More specifically, this is accomplished by coupling the data lead 243 to the up/down port of the counter used to implement the quarter bit register 240, by clocking and enabling the quarter bit register 240 only upon reception of an external quarter bit indicator 242, and by coupling the overflow bit 244 of the register 240 to the up/down port of the quadrant register 230. The ¼ bit indicator 242 is coupled to the interpolation counter 224 in order to restart its counting process. The restarting of the counting process is necessary in systems which require resynchronization with the such irregular non-integer bit times. The output 246 of the quarter bit register 240 addresses the ROMs 210 and 212 according to the specification of the program of appendix A.

Using ¼ bit incrementation as an example, a two bit register or counter may be used in the implemention of the quarter-bit register 240.

It should be noted that the data shift register 226 should contain all "1"s or all "0"s before the ¼ bit indicator activates so that the FIR portion of the circuit is in a steady state mode.

Appendix B illustrates a state diagram of the quadrant register 230. There are four states which represent this operation and 3 conditions to which the states react. Each state represents a steady state condition of the quadrant register 230. Condition "A" occurs when the output of the data shift register is high and the interpolation counter 224 has reached 15 (counting from 0 to 15); or the output of the data shift register is high and the outputs of the quarter bit register 240 represent "3" (highest count from 0 to 3 of a 2 bit counter) and the ¼ bit indicator 242 is high. Condition "B" occurs when the output of the data shift register is low and the interpolation counter 224 has reached 15 (counting from 0 to 15); or the output of the data shift register is low and the outputs of the quarter bit register 240 represent "0" (lowest count from 0 to 3 of a 2 bit counter) and the ¼ bit indicator 242 is high. The "else" condition represents all other conditions.

Appendix C illustrates a state diagram of the quarter bit register 240. There are four states which represent this operation and 3 conditions to which the states react. Each state represents a steady state condition of the quarter bit register 240. Condition "A" occurs when the output of the data shift register is high and the ¼ bit indicator 242 is high. Condition "B" occurs when the output of the data shift register is low and the ¼ bit indicator 242 is high. The "else" condition represents all other conditions.

APPENDIX A

```c
/* THIS PROGRAM GENERATES THE GMSK I-CHANNEL BASEBAND WAVEFORM FOR */
/* A QUADRATURE MODULATOR.                                         */
/*                                                                 */
/***************************************************************** */
#DEFINE RECORD_LENGTH        32         /*BYTES PER DOWNLOADING LINE */
#DEFINE ADDR_WIDTH           13         /*NUMBER OF ADDRESS BITS    */
#DEFINE SR_LENGTH            5          /*LENGTH OF SHIFT REG       */
#DEFINE COUNTER_LENGTH       4          /*LENGTH OF COUNTER         */
#DEFINE INTERPOLATION_FACTOR 16
#DEFINE START_ADDRESS        0          /*DOWNLOAD START ADDRESS    */
#DEFINE PULSE_SHAPE          GAUSSIAN
#DEFINE CONVERSION           TRIG       /*'NULL' FOR PSK            */
#DEFINE COMPONENT            SIN        /*I CHANNEL                 */
#DEFINE OFFSET               0          /*'1' FOR OQPSK             */
#DEFINE BT                   0.30       /*BT PRODUCT FOR GASSIAN LPF*/
#DEFINE DA_BIT               8          /*D/A RESOLUTION            */
#DEFINE OUTPUT_FORMAT        s19        /*PROGRAMMER DOWNLOAD FORMAT*/
#DEFINE QR1                  10         /*ADDRESS LINE FOR QR1      */
#DEFINE QR0                  9          /*ADDRESS LINE FOR QR0      */
#DEFINE QB1                  12         /*ADDRESS LINE FOR QB1      */
#DEFINE QB0                  11         /*ADDRESS LINE FOR QB0      */

/* GLOBAL VARIABLES */
UNSIGNED LONG INT ROM_SIZE;
INT BIT[15];
INT INVERT[15] = {1,0,0,0,0,0,0,0,0,0,0,0,0,0,0,};
        /* BIT[0] WILL BE INVERTED FOR EPROM */
INT TIME[] = {0,1,2,3};
INT SR[] = {4,5,6,7,8};
DOUBLE SYMBOL [SR_LENGTH] [INTERPOLATION_FACTOR];
#INCLUDE <STDIO.H>
#INCLUDE <MATH.H>
#INCLUDE "GAUSSIAN.H"
#INCLUDE "s19.H"
#INCLUDE "MODULATOR.H"

/***************************************************************** */
#DEFINE RECORD_LENGTH        32         /*BYTES PER DOWNLOADING LINE */
#DEFINE ADDR_WIDTH           13         /*NUMBER OF ADDRESS BITS    */
#DEFINE SR_LENGTH            5          /*LENGTH OF SHIFT REG       */
#DEFINE COUNTER_LENGTH       4          /*LENGTH OF COUNTER         */
#DEFINE INTERPOLATION_FACTOR 16
#DEFINE START_ADDRESS        0          /*DOWNLOAD START ADDRESS    */
#DEFINE PULSE_SHAPE          GAUSSIAN
#DEFINE CONVERSION           TRIG       /*'NULL' FOR PSK            */
#DEFINE COMPONENT            COS        /*Q CHANNEL                 */
#DEFINE OFFSET               0          /*'1' FOR OQPSK             */
#DEFINE BT                   0.30       /*BT PRODUCT FOR GASSIAN LPF*/
#DEFINE DA_BIT               8          /*D/A RESOLUTION            */
#DEFINE OUTPUT_FORMAT        s19        /*PROGRAMMER DOWNLOAD FORMAT*/
```

APPENDIX A

```
#DEFINE QR1            10        /* ADDRESS LINE FOR QR1    */
#DEFINE QR0             9        /* ADDRESS LINE FOR QR0    */
#DEFINE QB1            12        /* ADDRESS LINE FOR QB1    */
#DEFINE QB0            11        /* ADDRESS LINE FOR QB0    */

/* GLOBAL VARIABLES */
UNSIGNED LONG INT ROM_SIZE;
INT BIT[15];
INT INVERT[15] = {1,0,0,0,0,0,0,0,0,0,0,0,0,0,0,};
        /* BIT[0] WILL BE INVERTED    */
INT TIME[] = {0,1,2,3};
INT SR[] = {4,5,6,7,8};
DOUBLE SYMBOL [SR_LENGTH] [INTERPOLATION_FACTOR];

#INCLUDE <STDIO.H>
#INCLUDE <MATH.H>
#INCLUDE "GAUSSIAN.H"
#INCLUSE "s19.H"
#INCLUDE "MODULATOR.H"

/* GAUSSIAN.H MODULE TO BE INCLUDED BY MAIN MODULE.               */
/* TO GENERATE AN ISOLATED, GAUSSIAN LOW PASSED, NRZ              */
/* OUTPUT SYMBOL. COUNTER LENGTH, SR_LENGTH AND BT CONSTANT       */
/* FOR THE GAUSSIAN LPF ARE DEFINED IN THE MAIN MODULE.           */
/* OUTPUT WAVEFORM IS STORED IN AN EXTERNALLY DEFINED ARRAY       */
/* CALLED SYMBOL[N][T].                                           */

GAUSSIAN(SR_LEN, INTERPOLATION, BT)
INT SR_LEN, INTERPOLATION;
DOUBLE BT;

{
        DOUBLE S, OFFSET;
        DOUBLE K1,K2,K3,K4
        DOUBLE A1,A2,A3,A4;
        INT N, T;
        K1 = 0.785398163397448;
        K2 = 5.336446257 * BT;
        K3 = 0.0830353088 / BT;
        K4 = 28.47765865 * BT * BT;
        OFFSET = SR_LEN / 2;
        FOR (N=0; N< SR_LEN; N++) {
             FOR (T=0; T< INTERPOLATION; T++) {
                  S=((DOUBLE)T) / INTERPOLATION
                        + ((DOUBLE)N) - OFFSET;
                  A1 = (S+0.5) * ERF (K2 * (S+0.5));
                  A2 = (S-0.5) * ERF (K2 * (S-0.5));
                  A3 = EXP(K4 * (S+0.5) * (S+0.5));
                  A4 = EXP(K4 * (S-0.5) * (S-0.5));
                  SYMBOL[N][T] = K1 * (1+A1-A2) + K3 * (A3-A4);
             }
        }
}

/* s19.H MODULE TO BE INCLUDED BY THE MAIN MODULE.                */
s19 (ADDRESS, DATA)          /* GENERATE S19 RECORDS */
UNSIGNED LONG INT ADDRESS;
UNSIGNED INT DATA;
{
```

APPENDIX A

```
EXTERN UNSIGNED LONG INT ROM_SIZE;
STATIC INT BYTE_COUNT = RECORD_LENGTH;
STATIC UNSIGNED INT CHECKSUM = 0;
IF ((ADDRESS - START_ADDRESS) % RECORD_LENGTH ==0) {
        PRINTF ("S1");
        BYTE_COUNT = ROM_SIZE - ADDRESS;
        IF (BYTE_COUNT > RECORD_LENGTH) BYTE_COUNT = RECORD_LENGTH;
        PRINT2H (BYTE_COUNT+3)
        PRINT4H (ADDRESS);
        CHECKSUM = BYTE_COUNT + 3 + ADDRESS % 256 + ADDRESS /256;
}
CHECKSUM = CHECKSUM + DATA;
BYTE_COUNT--;
PRINT2H (DATA);
IF (BYTE_COUNT == 0) {
        CHECKSUM = 255 - CHECKSUM % 256;
        PRINT2H (CHECKSUM);
        PRINTF ("\N");
        IF (ADDRESS + 1 == ROM_SIZE) PRINTF("S9030000FC\N");
}
}

PRINT2H(X)                        /* PRINT X AS TWO HEX DIGITS */
INT X;
{
        STATIC CHAR HEX[] = "0123456789ABCDEF";
        UNSIGNED INT Y;
        Y = X/16;
        IF (Y > 15 || Y < 0) PRINTF ("?")
        ELSE {
                PUTCHAR(HEX[Y]);
        }
        Y = X % 16;
        PUTCHAR (HEX[Y]);
        RETURN;
}

PRINT4H (X)                       /* PRINT X AS FOUR HEX DIGITS */
INT X;
{
        UNSIGNED INT Y;
        IF (X > 65535 || X < 0) PRINTF("????");
        ELSE {
                Y = X / 256;
                PRINT2H (Y);
                Y = X % 256;
                PRINT2H (Y);
                RETURN;
        }
}

/* MODULATOR.H MODULE TO BE INCLUDED BY THE MAIN MODULE.        */
/* THIS IS DESIGNED FOR THE GENERIC QUADRATURE MODULATOR.       */
/* ALL PREPROCESSOR STATEMENTS ARE DEFINED IN THE *.C FILE.     */
/* REVISION HISTORY:                                            */
/*     12/05/86          FIRST CREATED                          */
/*     02/18/87          MODIFIED FOR REVERSING SHIFT REGISTER  */
/*     5/26/88           TRIG(X) MODIFIED FOR QUARTER BIT       */
/*     7/01/88           ADD INVERT[15] MASK FOR INVERTED INPUT */
/*                       TO EPROM. REQUIRED TO SUPPORT GDB      */
/*                       TIMING.                                */
GETBIN (X)                        /* CONVERT X TO BINARY IN BIT[]  */
UNSIGNED INT X;
{
```

APPENDIX A

```
        EXTERN INT BIT[15];
        EXTERN INT INVERT [15];
        INT I;
        FOR (I=0; I<16; I++) {
                BIT [I] = X % 2;
                BIT [I] = BIT [I] ^ INVERT [I];
                X = X >> 1;
        }
}

DOUBLE ECHO(ADDRESS)          /* CONVOLUTION PROCESS */
LONG INT BIT[15];
{
        EXTERN INT BIT[15];
        EXTERN DOUBLE SYMBOL[SR_LENGTH] [INTERPOLATION_FACTOR];
        INT I, J, T;
        DOUBLE Y;
        GETBIN (ADDRESS);
        J = TIME[COUNTER_LENGTH - 1];
        T = BIT[J] ^ OFFSET;
        FOR (I = COUNTER_LENGTH -2; I>= 0; I--) {
                J = TIME[I];
                T = T * 2 + BIT[J];
        }
        Y = 0;
        FOR (I = 0; I < SR_LENGTH; I++) {
                J = SR[I];
                Y = Y + (2 * ((DOUBLE)BIT[J]) -1) *SYMBOL[I][T];
        }
        RETURN (Y);
}

DOUBLE NULL(X)                /* NULL FUNCTION FOR QPSK OR OQPSK */
DOUBLE X;
{
        RETURN(X);
}

DOUBLE TRIG(X)    /* PHASE TO I/Q CONVERSION FOR MSK AND GMSK    */
DOUBLE X;
{
        EXTERNAL BIT[15];
        DOUBLE Y, P = 3.14159265358979323846;
        INT B, B0, B1, B2, B3;
        B0 = BIT[QB0];
        B1 = BIT[QB1];
        B2 = BIT[QR0];
        B3 = BIT[QR1];
        B = B0 + 2 * B1 + 4 * B2 + 8 * B3;
        X = X + B * P /
        Y = COMPONENT(X);
        RETURN(Y);
}
```

APPENDIX A

```
MAIN()
{
    UNSIGNED LONG INT ADDRESS;
    UNSIGNED DATA;
    INT I, DA_STEPS;
    DOUBLE X;
    DOUBLE BT = BT;
    INT SR_LEN = SR_LENGTH
    INT INTERPOLATION = INTERPOLATION_FACTOR;
    ROM_SIZE = 1;
    FOR (I = 0; I < ADDR_WIDTH; I++) ROM_SIZE = ROM_SIZE * 2;
    DA_STEPS = 1;
    FOR (I = 0; I < DA_BIT; I++) DA_STEPS = DA_STEPS * 2;
    DA_STEPS = DA_STEPS - 1;
    PULSE_SHAPE (SR_LEN, INTERPOLATION, BT);
    FOR ADDRESS = 0; ADDRESS < ROM_SIZE; ADDRESS ++) {
        X = ECHO(ADDRESS)
        X = CONVERSION(X);
        X = (X + 1) * DA_STEPS / 2 + 0.5;
        DATA = (INT)X;
        OUTPUT_FORMAT (ADDRESS, DATA);
    }
}
```

APPENDIX B

QUARDRANT REGISTER STATE DIAGRAM

A={(SHIFT_OUT == H) AND (INTERP_COUNT == 15)}
OR { (SHIFT_OUT ==H) AND (QUARTER_BIT_REG == 3) AND
    (QUARTER_BIT_INDICATOR == H) }

B={(SHIFT_OUT ==L) AND (INTERP_COUNT == 15)}
OR { (SHIFT_OUT == L) AND (QUARTER_BIT_REG == 0) AND
    (QUARTER_BIT_INDICATOR == H)}

APPENDIX C

QUARTER BIT REGISTER STATE DIAGRAM

A = (SHIFT_OUT == H) AND (QUARTER_BIT_INDICATOR == H)

B = (SHIFT_OUT == L) AND (QUARTER_BIT_INDICATOR == H)

What is claimed is:

1. A modulation arrangement having at least one preprogrammed memory device which may be selectively addressed so that it generates a representative digital waveform based on an input data stream, a clock signal, and the preprogrammed contents of the memory device, wherein the digital waveform is converted to an analog signal, by a digital-to-analog converter, for radio frequency modulation to provide a modulated carrier, the improvement comprising:

means for selectively addressing the memory device, for specifying the phase of the analog signal, in response to a signal indicative of a noninteger bit interval, whereby the phase continuity of the modulated carrier is maintained.

2. A digital modulator having an I-channel memory device and a Q-channel memory device, each memory device having a look-up table useful for generating a representative digital waveform based on a clocked input data stream and the preprogrammed contents of the memory device;

wherein each digital waveform is converted to an analog signal by a digital-to-analog converter for radio frequency (RF) modulation to provide a modulated carrier;

wherein each memory device is addressed to specify the phase of the analog signal and the modulated carrier, wherein the improvement comprises:

means for indicating a non-integer bit interval; and in response to said indication means, means for selectively addressing the memory devices for specifying the phase of the analog signal, whereby the phase continuity of the modulated carrier is maintained.

3. A digital modulator for generating angle modulated carriers comprising:

a clock circuit, synchronized to an input data signal, for producing clock signals;

at least one preprogrammed memory device having a content;

a control circuit, controlled by the clock signals, for addressing the preprogrammed memory device in response to the input data signal, to access the preprogrammed memory device content; and a counter, coupled to the control circuit and controlled by an indicator signal that indicates a non-integer bit interval, for selectively addressing the preprogrammed memory device in response to said indicator signal, whereby the phase continuity of an angle modulated carrier is maintained during non-integer bit modulations.

4. The digital modulator according to claim 3 wherein the control circuit comprises:
- an interpolation counter, driven by the clock signals, for establishing a data transmission rate and providing memory device address signals to the preprogrammed memory device at the data transmission rate;
- a data shift register, coupled to the interpolation counter, for receiving the input data signals and providing preprogrammed memory device address signals representing components of a baseband modulation signal; and
- a quadrant register, coupled to and controlled by data shifted out of the data shift register, for providing preprogrammed memory device address signals representing a phase angle of the input data signals with respect to the clock signals.

5. The digital modulator according to claim 4 wherein the indicator signal is coupled to the interpolation counter for restarting interpolation counter counting procedures upon receiving an indicator signal.

6. The digital modulator according to claim 3 further comprising:
- a digital-to-analog converter, coupled to the preprogrammed memory device, for receiving preprogrammed memory device content and converting said preprogrammed memory device content into samples of an angle modulated carrier.

7. A digital modulator for generating angle modulated carriers comprising:
- a clock circuit, synchronized to an input data signal, for producing a clock signal;
- at least one preprogrammed memory device having a contents;
- a control circuit for addressing the preprogrammed memory device comprising:
  - an interpolation counter, driven by the clock signal, for establishing a data transmission rate and providing preprogrammed memory device address signals to the preprogrammed memory device at the data transmission rate,
  - a data shift register, coupled to the interpolation counter, for receiving the input data signal and providing preprogrammed memory device address signals representing components of a baseband modulation signal, and
  - a quadrant register, coupled to and controlled by data shifted out of the data shift register, for providing preprogrammed memory device address signals representing a phase angle of the input data signal with respect to the clock signal, whereby a phase angle calculation is performed; and
- a counter, coupled to the quadrant register and controlled by an indicator signal that indicates a non-integer bit interval, for selectively addressing the preprogrammed memory device in response to said indicator signal, whereby the phase continuity of an angle modulated carrier is maintained during non-integer bit modulations.

8. The digital modulator according to claim 7 wherein the indicator signal is coupled to the interpolation counter for restarting interpolation counter counting procedures upon receiving an indicator signal.

9. The digital modulator according to claim 7 further comprising:
- a digital-to-analog converter, coupled to the preprogrammed memory device, for receiving preprogrammed memory device content and converting said preprogrammed memory device content into samples of an angle modulated carrier.

10. The digital modulator according to claim 7 wherein the indicator signal that indicates a non-integer bit interval is transmitted by the input data signal source.

11. The digital modulator according to claim 7 wherein the quadrant register is a 2-bit up/down counter.

12. The digital modulator according to claim 7 wherein the counter is a 2-bit up/down counter.

13. The digital modulator according to claim 7 wherein the interpolation counter is a divide-by-N ripple counter.

14. The digital modulator according to claim 7 wherein the data shift register is an M-bit shift register.

* * * * *